Patented Apr. 27, 1948

2,440,669

UNITED STATES PATENT OFFICE 2,440,669

ALDEHYDE CONDENSATION PRODUCTS OF SULFONATED AROMATIC COMPOUNDS AS CATION EXCHANGE RESINS

Jack T. Thurston, Riverside, Conn., assignor to American Cyanamid Company, New York, N. Y., a corporation of Maine No Drawing. Application June 21, 1944, Serial No. 541,480

7 Claims. (Cl. 260—49)

This invention relates to cation active materials, that is materials which exchange or extract by other means cations from fluid media.

An object of this invention is to provide a substantially insoluble resin having a relatively high capacity for the absorption of cations.

This and other objects are attained by resinifying a mixture including a least one aldehyde selected from the group consisting of formaldehyde and furfural and a sulfonated compound having the following general formula:

$$R_1-CH-CHRX$$
$$|$$
$$SO_3M$$

in which $R_1$ is a hydroxyaromatic radical of the benzene series, X is an activating group possessing a polar bond selected from the group consisting of —CO-aliphatic, —CO-aromatic, —Co-aliphatic-aromatic, —COOR, —CN, and —NO$_2$, M is selected from the group consisting of metals, hydrogen and —H.NR$_2$R$_3$R$_4$, and R, R$_2$, R$_3$, and R$_4$ are selected from the group consisting of hydrogen and organic radicals.

One method for preparing sulfonated compounds of the aforementioned type is by condensing a hydroxy benzaldehyde with a substance containing an active methyl group or an active methylene group and converting the resulting condensation product into a sulfonate by reaction with a bisulfite. The term "sulfonate" as used herein includes the hydrogen sulfonate, i. e., the sulfonic acid, as well as the metal, ammonia, and amine salts thereof.

The following examples are given by way of illustration and not in limitation. The proportions are in parts by weight and the Formalin is an aqueous solution containing 37% formaldehyde.

EXAMPLE 1

*Preparation of o-hydroxybenzalacetone*

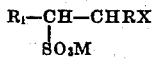

220 parts of ethanol are added to a mixture of 244 parts (2.0 mols) of salicylaldehyde, 464 parts (8.0 mols) of acetone, and 600 parts of water at room temperature. A solution of 160 parts (4.0 mols) of sodium hydroxide in 400 parts of water are then added at such a rate that the temperature does not exceed 35° C. After a short time a light yellow precipitate which is probably the sodium salt of salicylaldehyde begins to form. This precipitate redissolves, however, when about half of the alkali has been added. The solution becomes darker in color as the alkali is added until, when the addition is complete, it is a dark red. There is some precipitation of the sodium salt of the product. Stirring is continued for one hour and the reaction mixture then neutralized with 288 parts of glacial acetic acid. The product separates in the form of light yellow crystals which, after drying in a vacuum desiccator, melt at 128°-132° C. and are obtained in a yield of 77% of the theoretical.

The above procedure is repeated except that the product is precipitated by passing carbon dioxide through the reaction mixture. The 2-hydroxybenzalacetone so obtained in a yield of 54% melts at 135°-138° C.

Upon recrystallization from benzene, pale yellow needles melting at 137°-138° C. are obtained.

*Preparation of sodium 1-(o-hydroxyphenyl)-3-ketobutane sulfonate*

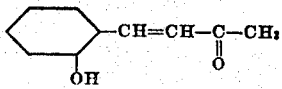

A mixture of 162 parts (1.0 mol) of 2-hydroxybenzalacetone, 104 parts (1.0 mol) of sodium bisulfite, and 400 parts of water is placed in a vessel equipped with a stirrer and reflux condenser. The mixture is heated to boiling and 47 parts of the monoethyl ether of ethylene glycol are added to cause complete solution. The solution is refluxed for 3 hours and evaporated on a steam bath under reduced pressure. The solution obtained, brown in color, is used without further purification in the preparation of resins.

The product may be obtained as a white crystalline solid by further evaporation and allowing the concentrated solution to stand for a period of time.

*Preparation of resin*

A solution of 6 parts (0.06 mol) of concentrated hydrochloric acid in 48.6 parts (0.1 mol) of sodium 1-(o-hydroxyphenyl)-3-ketobutane sulfonate is heated to 75° C. at which temperature there is an evolution of sulfur dioxide. Heating is stopped and 16.2 parts (0.2 mol) of Formalin are added. The precipitate formed thickens to a thermoplastic material and later becomes hard. The mixture is heated for a total of a half hour at 75° C. The purple-black and brittle solid is removed from the liquid, broken up, and cured for 4 hours at 100° C.

EXAMPLE 2

The above procedure of resin preparation is repeated except that the solution is cooled so that the temperature does not exceed 25° C. After the solution has stood for about 24 hours, a soft elastic cohesive violet-colored gel is formed which, at the end of about 96 hours, is firm and brittle. The gel is broken into small particles and cured for 4 hours at 50° C. and for 4 hours at 100° C. The resin has a capacity for the absorption or exchange of cations from aqueous media equivalent to about 5,600 grains of calcium carbonate per cubic foot of resin.

EXAMPLE 3

A resin is again prepared as in Example 1, this time using 5 times the quantities of materials and maintaining the temperature at or below 15° C. during the preparation of the solution. The resulting resin has a capacity for absorbing or exchanging cations from an aqueous solution equivalent to about 8,700 grains of calcium carbonate per cubic foot of resin and a density of 26.6 pounds per cubic foot.

EXAMPLE 4

To 48.6 parts (0.1 mol) of the sulfonate solution prepared in Example 1 are added 24.3 parts (0.3 mol) of Formalin and 11 parts of triethanolamine. The solution is heated to 70° C. to allow the materials to react and 9.4 parts (0.1 mol) of phenol are added, followed by 12 parts (0.12 mol) of concentrated hydrochloric acid. The solution immediately reddens and the color darkens rapidly. The temperature is maintained at 70° C. and an oil soon begins to form. It slowly thickens until a thermoplastic ball is formed. After 45 minutes, the solid material is removed from the solution, broken up and cured for 4 hours at 100° C. The resulting cured product is purple-black and brittle.

EXAMPLE 5

*Preparation of o-hydroxy-m-methoxy-benzalacetone*

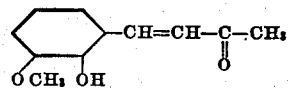

A mixture of 232 parts (4.0 mols) acetone and 1745 parts of 2.5% sodium hydroxide solution is added to 142 parts (1.0 mol) of 2-hydroxy-3-methoxybenzaldehyde and the light red colored solution stirred while 472 parts of 10% sodium hydroxide solution are added over a period of one hour. After standing for about 72 hours the solution is diluted with 4260 parts of water and acidified with 3454 parts of 5% hydrochloric acid. The yellow crystalline solid which separates is filtered off, washed well with water and placed in a vacuum desiccator. The material melting at 65°–70° C. is obtained in a yield of 69%.

*Preparation of potassium 1-(o-hydroxy-m-methoxyphenyl)-3-ketobutane sulfonate*

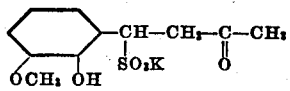

A mixture of 19 parts (0.1 mol) of o-hydroxy-m-methoxybenzalacetone, 11 parts (0.05 mol) of potassium metabisulfite (equivalent to 0.1 mol of potassium bisulfite) and 75 parts of water is heated to boiling and refluxed for 3 hours. The solution is evaporated to a small volume and a solid precipitates on standing. This is crystallized from alcohol as a paste. After drying a tan powder is obtained in a yield of 29%. After two additional crystallizations of the product from alcohol, it melts at 179° C.

This product may be resinified in the same general manner as described in Examples 1-4.

EXAMPLE 6

*Preparation of o-hydroxybenzalmethyl ethyl ketone*

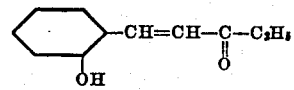

A solution of 258 parts (6.45 mols) of sodium hydroxide in 1000 parts of water is added to a mixture of 366 parts (3.0 mols) of salicylaldehyde and 432 parts (6.0 mols) of methyl ethyl ketone in 2000 parts of water and the solution is heated for 3.5 hours at 80°–85° C. The reaction mixture is diluted with water and neutralized with 5% hydrochloric acid while it is stirred and cooled with ice. The resulting precipitate which is partly gummy and partly crystalline is crystallized from benzene to give a product, melting at 108° C., in a yield of 41%.

*Preparation of potassium 1-(o-hydroxyphenyl)-3-ketopentane sulfonate*

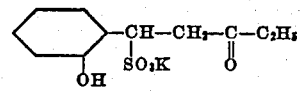

A mixture of 17.6 parts (0.1 mol) of o-hydroxybenzalmethyl ethyl ketone, 11.1 parts (0.05 mol) of potassium metabisulfite (equivalent to 0.1 mol of potassium bisulfite) and 65 parts of water is refluxed for 2 hours and evaporated to a small volume. The solid, which is formed on standing, is washed with alcohol, dried, and finally obtained in a yield of 61%. After two crystallizations from alcohol, the material melts at 134° C.

*Preparation of sodium 1-(o-hydroxyphenyl)-3-ketopentane sulfonate*

The above procedure is repeated except that sodium bisulfite is used in place of the potassium metabisulfite, and larger quantities of all the reactants are used. The solution is evaporated to a small volume and the crystals obtained in a yield of 42% are washed with alcohol and dried.

*Preparation of resin*

A solution of 124 parts (0.44 mol) of sodium 1-(o-hydroxyphenyl)-3-ketopentane sulfonate in 100 parts of water is prepared and cooled to 10° C. and 26 parts (0.27 mol) of concentrated hydrochloric acid which has been cooled to 10° C. are added. 71 parts (0.88 mol) of Formalin which has been cooled to 1° are added. The solution is then removed from the ice bath and allowed to stand. The firm gel which forms after one day is broken into small particles and cured for 4 hours at 50° C. and for 16 hours at 100° C. The product has a capacity for absorbing cations from solution equivalent to about 3,300 grains of calcium carbonate per cubic foot of resin and a density of 14.3 pounds per cubic foot.

A similar product may be prepared by substituting an equivalent proportion of the potassium salt for the sodium salt.

EXAMPLE 7

Preparation of o-hydroxybenzalmethyl isobutyl ketone

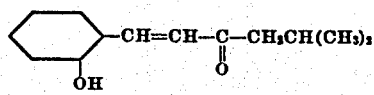

A solution of 86 parts (2.15 mols) of sodium hydroxide in 1000 parts of water is added to 122 parts (1.0 mols) of salicylaldehyde dissolved in 200 parts of (2.0 mols) of methyl isobutyl ketone, and the mixture is heated for 2 hours at 85°–90° C. The reaction mixture is diluted and acidified with 5% hydrochloric acid. The product, which is filtered, washed with water, and dried in a vacuum desiccator, has a melting point of 101° C. and is obtained in a 51% yield.

Preparation of potassium 1-(o-hydroxyphenyl)-3-keto-5-methylhexane sulfonate

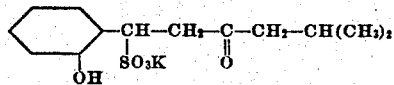

A mixture of 20.4 parts (0.1 mol) of o-hydroxybenzalmethyl isobutyl ketone, 11.1 parts (0.05 mol) of potassium metabisulfite and 40 parts of water is refluxed for 2 hours. The solution is cooled and on standing a solid obtained in a yield of 56% is separated, washed with acetone and then dried.

Preparation of resin

A solution of 146 parts (0.45 mol) of potassium-1-(o-hydroxyphenyl)-3-keto-5-methylhexane sulfonate in 150 parts of water is prepared by heating the mixture on a steam bath. Upon cooling to 15° C., a partial precipitation occurs. 26 parts (0.27 mol) of concentrated hydrochloric acid which has been cooled to 15° C. are then added, followed by 73 parts (0.9 mol) of Formalin which has also been cooled to 15° C. Only a part of the solid material is dissolved and stirring is continued for 6 hours at the end of which time a small amount of solid is still present as a fine suspension. After about 24 hours a soft gel forms which becomes firm upon standing. The gel is broken into small particles and cured for 4 hours at 50° C. and 16 hours at 100° C.

Most of the sulfonates useful in accordance with my invention have the following general formula:

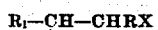

wherein $R_1$ is a hydroxy substituted aromatic radical of the benzene series, X is an activating group possessing a polar bond such as, for example, —CO-aliphatic, —CO-aromatic, —CO--aliphatic-aromatic, —COOR, —CONRR, —CN, and —NO₂. M is a hydrogen, a metal or —H.NR₂R₃R₄ and R, R₂, R₃, and R₄ are hydrogen or organic radicals. The R and X groups may include additional hydroxy-substituted aromatic radicals of the benzene series and/or additional sulfonate groups. Any of the R's in the above formula or in the succeeding formulae may be any desired organic radical since they do not form the essential characteristics of my compositions.

It is apparent that one mol of a hydroxy benzaldehyde may be reacted with one mol of a ketone or other active compound and the resulting compound reacted with one mol of a bisulfite or sulfurous acid. On the other hand, ketones or other substances having two active groups, either methyl or methylene, may be combined with 2 mols of hydroxy aromatic aldehyde and the resulting compound in turn treated with one or two mols of a bisulfite or sulfurous acid. In these latter cases, the sulfonates would be represented by the following general formulae, respectively:

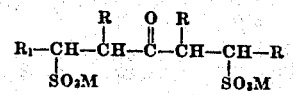

and

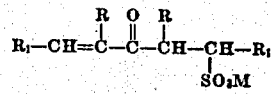

in which R, $R_1$ and M have the same significance as in the preceding formula.

It may be desirable to employ an excess of the bisulfite or of the active compound in order to drive the reaction to completion.

The sulfonic acids used in the above examples are merely representative of those suitable for use in accordance with my invention. Various mixtures of the sulfonic acid may be used in place of the individual compounds if desirable. One large group of sulfonic acids which may be employed are those formed by condensing a hydroxy aromatic aldehyde with a ketone and subsequently adding a bisulfite or sulfurous acid to the condensation product to produce a corresponding sulfonate or sulfonic acid. Ketones having an active methyl group or an active methylene group other than those employed in the previous examples may be used, e. g., methylhexyl ketone, di-n-butyl ketone, acetophenone, methyl benzyl ketone, etc. Furthermore, mixture of the various ketones may be employed.

The ketones are merely illustrative of a large number of substances containing an active methyl or an active methylene group which may be condensed with a hydroxy aromatic aldehyde to yield an unsaturated compound to which a bisulfite or sulfurous acid may be added. Broadly speaking the substances which may be reacted with a hydroxy aromatic aldehyde have the following general formula:

where R is hydrogen or an organic radical, and X is an activating group possessing a polar bond. The condensation of a hydroxy aromatic aldehyde with a compound of this type results in a substance of the following general formula:

where $R_1$ represents a hydroxy substituted aromatic radical of the benzene series and R and X have the same significance as above. Vinylogs of these substances are included since it is known that the polar bond activates groups separated therefrom by one or more vinyl groups.

A few examples of suitable compounds containing an active methyl or methylene group are: cyanoacetic acid, crotonic acid, sorbic acid, propionic acid, butyric acid, succinic acid, malonic acid, pyruvic acid, phenylacetic acid, oxalacetic acid, 3,5-dinotro-o-toluic acid, the esters of these acids (such as the methyl, ethyl, benzyl and phenyl esters) and their amides; crotonaldehyde, sorbic aldehyde, propionaldehyde, heptaldehyde, succinic aldehyde, phenylacetaldehyde; acetonitrile, propionitrile, crotonic nitrile, sucinonitrile, phenylacetonitrile; nitromethane, nitroethane, 1-nitropropane, 1-nitrobutane, 1-nitropropylene, 1-nitro-octylene-2, etc.

The salicylaldehyde and methoxybenzaldehyde recited in the examples are merely illustrative of a large number of hydroxyaromatic aldehydes of the benzene series which may be condensed with compounds containing an active methyl or methylene group or groups. Hydroxyaromatic aldehydes of the benzene series containing additional substituent such as, for example, hydroxyl, sulfoxy, halogen, alkyl, aryl, alkaryl, aralkyl, and the like are equally suitable.

A compound of the foregoing type may be converted to the corresponding sulfonate by treatment with sulfur dioxide in a solvent medium including water or by treatment with a bisulfite. Suitable bisulfites include: sodium bisulfite, potassium bisulfite, ammonium bisulfite or any other desirable metal bisulfite such as calcium bisulfite. In general, the alkali metal bisulfites are preferred. The hydrogen sulfonates may be converted to the corresponding metal, ammonium or amine salts if desired. Examples of amines useful in the formation of such salts are: methyl amine, dimethyl amine, pyridine, triethyl amine, the mono-, di-, and tri-ethanolamines, etc.

Another method of producing the sulfonic acids or sulfonates is by treatment of the benzylidene compounds with a hydrohalide followed by treatment with sodium sulfite or other metal sulfites. Thus, for example, hydrogen chloride may be added to benzylidene acetone and the resulting material treated with sodium sulfite.

Still another type of sulfonate may be prepared by the condensation of a hydroxybenzaldehyde with acetonesulfonic acid followed by reaction with a bisulfite.

The sulfonates may be prepared from the benzylidene compounds by reaction with bisulfite or sulfurous acid at temperatures ranging upwards from room temperature. In most instances, the reaction is advantageously carried out at a temperature between about 70° C. and about 130° C. although temperatures as low as room temperature may be employed. If sulfur dioxide be used the reaction is preferably carried out under pressure, e. g., 25–100#/sq. in. and/or at relatively low temperature such as about 20° C. The time of reaction varies somewhat according to the compatibility of the reactants. Thus, if a homogeneous solution of the reactants be employed, the reaction will usually be completed in from about one-half hour to about 2 hours. On the other hand, if the solution of the reactants is not homogeneous, 6–8 hours or even more may be required. Generally, water is employed as the solvent medium for the bisulfite or sulfurous acid and the benzylidene compound, but if they are not sufficiently soluble therein other solvents may be used. Mixtures of water and water-miscible organic solvents are especially suitable since the water is a good solvent for the bisulfite or sulfurous acid, while the organic solvent is a good solvent for the benzylidene compound. Examples of suitable solvents are methanol, ethanol, propanol, isopropanol, tertiary butanol, dioxane, the lower alkyl mono-ethers of ethylene glycol and diethylene glycol, such as monoethyl ether of ethylene glycol, the mono-butyl ether of diethylene glycol, etc. Furthermore, inert ketones may be employed as solvents for the reactants in the production of the sulfonates.

In some instances it may be desirable to employ active ketones as intermediates in the preparation of the sulfonates. Thus, bisulfite may be added to an active ketone and this in turn may react with the benzylidene compound, the former giving up the bisulfite to the latter.

It is preferable that the sulfonates which are suitable for the purposes of my invention should not contain any basic amino group because the latter might tend to form internal salts with the sulfonic group and thereby reduce the cation activity of the resin, particularly if the resin is to be used as a cation exchanger where, for example, alkaline earth metals are exchanged for sodium. However, my invention is not limited to the exclusion of amino groups and if desired they may be present.

The sulfonates described above are preferably resinfied with formaldehyde or furfural or a mixture of the two. Obviously, the formaldehyde may be replaced by a polymer of formaldehyde or a substance yielding formaldehyde. Moreover, a portion of the formaldehyde or furfural may be replaced by other aldehydes including acetaldehyde, butyraldehyde, heptaldehyde, crotonaldehyde, acrolein, benzaldehyde, etc. If a mixture of aldehydes is used, I prefer that it comprise a major portion of furfural and/or formaldehyde.

The molal ratio of aldehyde to sulfonate may be varied depending on the desired properties. Usually, molal ratios of aldehyde to sulfonate between about 1:1 and 3:1 are preferred. The molal ratio is adjusted within the aforementioned range taking into consideration the facts that swelling and solubility increase toward the low end of the range, while activity decreases toward the high end of the range.

The sulfonates may be condensed with furfural, Formalin or other aldehyde under acid, neutral or alkaline conditions, followed by gelation as illustrated in the foregoing examples. The gelation may be effected in an acid or alkaline medium; however, from a practical point of view either an acid or an acid salt is often used to induce gelation. For this purpose, strong mineral acids such as sulfuric acid, hydrochloric acid or phosphoric acid are convenient and effective. Other substances which may be used are acid salts, e. g., ferric sulfate, ferric chloride, boron trifluoride, mixtures of the mineral acids such as hydrochloric acid with any of the foregoing salts, etc. The amount of acid employed varies somewhat with different acids. Generally, the molal ratio of acid to sulfonate should be between about 1:4 and 3:2, preferably about 1:1.5. If ratios of acid to sulfonate greater than 1:1 be employed some activity may be lost because of the fact that some sulfur dioxide may split out, especially if the temperature be high.

After gelation of the sulfonate-aldehyde condensation product, the gels are preferably aged at room temperature until sufficiently hard to be ground into small particles. The gel is ground to any desired size, e. g., to pass through an 8–12 mesh screen. The ground gel is dried and cured by heating in any suitable manner. The drying and curing process may be carried out at temperatures between about 15° C. and about 200° C. The time required will, of course, vary somewhat with temperature. Generally, from about a half hour to about twenty-four hours is sufficient. At least part of the drying and curing operation is preferably carried out at a temperature of at least 100° C.

If desired, other materials which contribute to cation activity and which react with aldehydes may be included in my resinous compositions, e. g., phenols, polyhydric phenols, sulfonated mono- and poly-hydric phenols, other aromatic sulfonic acids, etc. Relatively inert aldehyde-reactive materials may also be included, e. g., urea, dicyandiamide, the aminotriazines such as melamine, the sulfonamides, etc.

My resinous materials may be used alone or in admixture with other cation-active materials. Furthermore, my resins may be applied before gelation to a suitable carrier such as diatomaceous earth, clays, charcoal, etc. In this way, the active resin is spread on the surface of a relatively inert material and this enables one to employ a smaller quality of resin than otherwise to obtain the same active area.

The granular resinous materials prepared according to my invention, and particularly those having a particle size less than 8 mesh, are useful in the removal of cations from fluid media, especially aqueous solutions. The resins may be used in the hydrogen-activated form to remove cations from solutions of bases. My resinous cation-active materials may also be employed as exchange materials in accordance with the principles applied to the use of the natural and synthetic zeolites. Thus, the resin may be activated with a sodium salt such as sodium chloride and upon contact with a solution containing calcium, magnesium or other cations, an exchange of the latter ions for the sodium ions takes place.

The activating solutions or regenerating solutions are dilute acid solutions or dilute salt solutions, e. g., about 0.2%–10% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than about 1 part of resin in 1,000 parts of water when passed through a bed of resin (after the first cycle comprising an activation, exhaustion and reactivation of the resin).

My resinous materials are useful for a wide variety of purposes. Some of the uses which may be mentioned by way of example are: water purification; purification of sugar juices; purification of water from lead pipes; removal of heavy metal ions from food, beverages and pharmaceutical products; decolorization of solutions containing coloring matters, etc. My condensation products may also be employed to recover valuable metal cations from dilute solutions, e. g., gold from sea water, chromium from chrome tanning liquors, silver from photographic baths, etc. Another important application of my materials is in the absorption or adsorption of gases such as ammonia, the amines, e. g., triethyl-amine, methyl amine, etc., from fluid media either dissolved in a liquid or from vapors.

My resinified sulfonic acids may be used in reduction processes such as in reducing ferric ions to ferrous ions, in reducing manganese ions to a lower degree of oxidation, and in reducing other cations to the metallic state, as well as for many other reduction purposes.

Obviously, many variations in the processes and compositions described above may be made without departing from the spirit and scope of the invention as defined in the appended claims. For instance, it will be apparent that in Examples 6 and 7, the initial condensation may occur on either of the active methyl or methylene groups of the ketone and the product obtained in Example 6 for instance might just as well be represented by the formula:

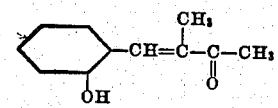

A mixture of compounds of both isomeric formulae may also be obtained. For simplification only one isomeric form of the compounds has been set out but it is to be understood that the composition may have either of the isomeric forms or it may be a mixture containing both isomeric forms.

I claim:

1. A granular water-insoluble composition of matter comprising the granulated gelled and water-insolubilized products of reaction of a mixture including formaldehyde and sodium 1-(o-hydroxyphenyl)-3-ketobutane sulfonate having the formula

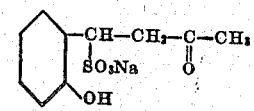

in a molar ratio of from 1:1 to 3:1.

2. A granular water-insoluble composition of matter comprising the granulated gelled and water-insolubilized products of reaction of a mixture including formaldehyde and sodium 1-(o-hydroxyphenyl)-3-ketopentane sulfonate having, in one of its isomeric forms, the formula

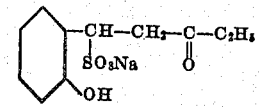

in a molar ratio of from 1:1 to 3:1.

3. A granular water-insoluble composition of matter comprising the granulated gelled and water-insolubilized products of reaction of a mixture including formaldehyde and potassium 1-(o-hydroxyphenyl)-3-keto-5-methylhexane sulfonate having, in one of its isomeric forms, the formula

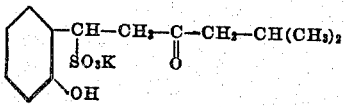

in a molar ratio of from 1:1 to 3:1.

4. A granular water-insoluble composition of matter suitable for the removal of cations from liquid media and comprising the granulated gelled and water-insolubilized products of reaction of a mixture including formaldehyde and a member of the group consisting of sulfonated compounds having the following general formula

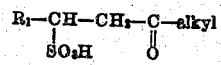

where $R_1$ is an aromatic radical of the benzene series nuclear substituted with a hydroxyl group, and their alkali and alkaline earth metal salts, their ammonium salts, and their organic amine salts, the molar ratio of aldehyde to sulfonated compound being from 1:1 to 3:1.

5. A process of preparing a granular water-insoluble composition of matter suitable for the removal of cations from liquid media which comprises reacting formaldehyde with a member of the group consisting of sulfonated compounds having the following general formula

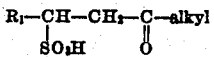

where $R_1$ is an aromatic radical of the benzene series nuclear substituted with a hydroxyl group, and their alkali and alkaline earth metal salts, their ammonium salts, and their organic amine salts in a molar ratio of from 1:1 to 3:1, aldehyde to sulfonated compound, gelling the resulting condensation product, heating the gel thus obtained until it is insoluble in water, and granulating the product.

6. A granular water-insoluble composition of matter suitable for the removal of cations from liquid media and comprising the granulated gelled and water-insolubilized products of reaction of a mixture including at least one aldehyde selected from the group consisting of furfural and formaldehyde and a member of the group consisting of sulfonated compounds having the following general formula

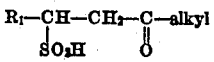

in which $R_1$ is an aromatic radical of the benzene series nuclear substituted with a hydroxyl group and their alkali and alkaline earth metal salts, their ammonium salts, and their organic amine salts, the molar ratio of aldehyde to sulfonated compound being from 1:1 to 3:1.

7. A process of preparing a granular water-insoluble composition of matter suitable for the removal of cations from liquid media which comprises reacting at least one aldehyde selected from the group consisting of furfural and formaldehyde with a member of the group consisting of sulfonated compounds having the following general formula

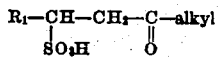

in which $R_1$ is an aromatic radical of the benzene series nuclear substituted with a hydroxyl group and their alkali and alkaline earth metal salts, their ammonium salts, and their organic amine salts, the molar ratio of aldehyde to sulfonated compound being from 1:1 to 3:1, gelling the resulting condensation product, heating the gel thus obtained until it is insoluble in water, and granulating the product.

JACK T. THURSTON.

REFERENCES CITED

The following references are of record in the file of this patent:

UNITED STATES PATENTS

| Number | Name | Date |
|---|---|---|
| 2,228,160 | Wassenegger et al. | Jan. 7, 1941 |
| 2,319,359 | Wassenegger | May 18, 1943 |

FOREIGN PATENTS

| Number | Country | Date |
|---|---|---|
| 734,279 | Germany | Mar. 18, 1943 |